(12) United States Patent
Hayes et al.

(10) Patent No.: US 11,030,031 B2
(45) Date of Patent: Jun. 8, 2021

(54) REDUNDANT SENSOR FABRIC FOR AUTONOMOUS VEHICLES

(71) Applicant: GHOST LOCOMOTION INC., Mountain View, CA (US)

(72) Inventors: John Hayes, Mountain View, CA (US); Volkmar Uhlig, Cupertino, CA (US)

(73) Assignee: GHOST LOCOMOTION INC., Mountain View, CA (US)

( * ) Notice: Subject to any disclaimer, the term of this patent is extended or adjusted under 35 U.S.C. 154(b) by 108 days.

(21) Appl. No.: 16/388,957

(22) Filed: Apr. 19, 2019

(65) Prior Publication Data
US 2020/0334099 A1    Oct. 22, 2020

(51) Int. Cl.
| G06F 11/07 | (2006.01) |
| B60W 50/04 | (2006.01) |
| B60W 50/02 | (2012.01) |
| B60W 50/029 | (2012.01) |

(52) U.S. Cl.
CPC ..... *G06F 11/0739* (2013.01); *B60W 50/0205* (2013.01); *B60W 50/029* (2013.01); *B60W 50/04* (2013.01); *G06F 11/0721* (2013.01); *B60W 2050/0215* (2013.01); *B60W 2050/0292* (2013.01)

(58) Field of Classification Search
CPC ............ G06F 11/0739; G06F 11/0721; G06F 11/1633; B60W 50/0205; B60W 50/029; B60W 50/04; B60W 50/02; G05B 19/0421
See application file for complete search history.

(56) References Cited

U.S. PATENT DOCUMENTS

| 9,868,446 B1 * | 1/2018 | Zhu ........................ G08G 1/163 |
| 2010/0324756 A1 * | 12/2010 | Fletcher ............. G05B 19/0428 |
| | | 701/3 |
| 2017/0123428 A1 * | 5/2017 | Levinson ................ G01S 13/86 |

* cited by examiner

*Primary Examiner* — Anne Marie Antonucci
*Assistant Examiner* — Andrew J Cromer (57) ABSTRACT

A redundant sensor fabric in an autonomous vehicle may include receiving, by a processing unit, sensor data from a first sensor of a plurality of sensors associated with a same sensing space of the autonomous vehicle; detecting a fault associated with the first sensor; establishing, via a switched fabric, a communications path between the processing unit and a second sensor of the plurality of sensors; and receiving, by the processing unit, sensor data from the second sensor instead of the first sensor.

20 Claims, 9 Drawing Sheets

REDUNDANT SENSOR FABRIC FOR AUTONOMOUS VEHICLES

BACKGROUND

Field of the Invention

The field of the invention is autonomous vehicles, or, more specifically, methods, apparatus, autonomous vehicles, and products for a redundant sensor fabric in an autonomous vehicle.

Description of Related Art

Autonomous vehicles operate by detecting their environment via one or more sensors, and making operational decisions based on the state of the autonomous vehicle and the environment. Failure in one of these sensors can degrade performance of the autonomous vehicle, and may inhibit autonomous operation.

SUMMARY

A redundant sensor fabric in an autonomous vehicle may include receiving, by a processing unit, sensor data from a first sensor of a plurality of sensors associated with a same sensing space of the autonomous vehicle; detecting a fault associated with the first sensor; establishing, via a switched fabric, a communications path between the processing unit and a second sensor of the plurality of sensors; and receiving, by the processing unit, sensor data from the second sensor instead of the first sensor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
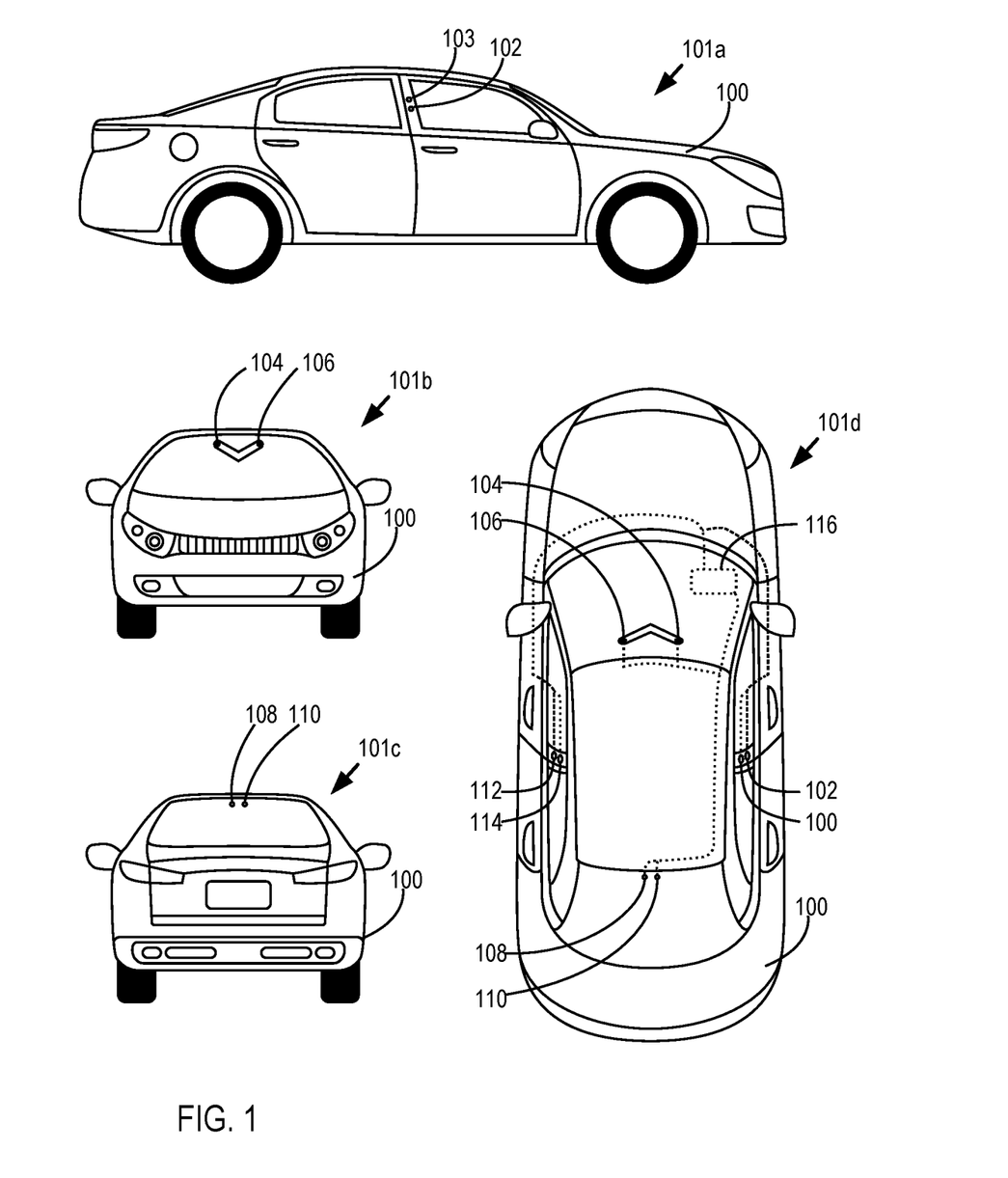
FIG. 1 shows example views of an autonomous vehicle having a redundant sensor fabric.

Example methods, apparatus, autonomous vehicles, and products for a redundant sensor fabric in an autonomous vehicle are described with reference to the accompanying drawings, beginning with FIG. 1. FIG. 1 shows multiple views of an autonomous vehicle 100 configured with a redundant sensor fabric in accordance with some embodiments of the present disclosure. Right side view 101a shows a right side of the autonomous vehicle 100, where sensors 102 and 103 are mounted on or otherwise affixed to the right side of the autonomous vehicle 100. The sensors 102 and 103 that are mounted on or otherwise affixed to the autonomous vehicle 100 may be configured to capture image data, video data, audio data, or any other data (including combinations thereof) that can be used to determine the environmental state of the autonomous vehicle 100 from the perspective of the right side of the autonomous vehicle 100.

Front view 101b shows a front side of the autonomous vehicle 100, where sensors 104 and 106 are mounted on or otherwise affixed to the front side of the autonomous vehicle 100. The sensors 104 and 106 that are mounted on or otherwise affixed to the front side of the autonomous vehicle 100 may be configured to capture image data, video data, audio data, or any other data (including combinations thereof) that can be used to determine the environmental state of the autonomous vehicle 100 from the perspective of the front side of the autonomous vehicle 100.

Rear view 101c shows a rear side of the autonomous vehicle 100, where sensors 108 and 110 are mounted on or otherwise affixed to the rear side of the autonomous vehicle 100. The sensors 108 and 110 that are mounted on or otherwise affixed to the rear side of the autonomous vehicle 100 may be configured to capture image data, video data, audio data, or any other data (including combinations thereof) that can be used to determine the environmental state of the autonomous vehicle 100 from the perspective of the rear side of the autonomous vehicle 100.

Top view 101d shows an overhead view of the autonomous vehicle 100. Shown in the top view 101d are sensors 102-110 as illustrated in previous views, as well as sensors 112 and 114 that are mounted on or otherwise affixed to the left side of the autonomous vehicle 100. The sensors 112 and 114 that are mounted on or otherwise affixed to the left side of the autonomous vehicle 100 may be configured to capture image data, video data, audio data, or any other data (including combinations thereof) that can be used to determine the environmental state of the autonomous vehicle 100 from the perspective of the left side of the autonomous vehicle 100. Readers will appreciate that the placement of the sensors 102-114 is merely for illustrative purposes and in no way represents a limitation on the arrangement of sensors, the manner in which the sensors are attached to the autonomous vehicle 100, and so on.

Further shown in the top view 101d is an automation computing system 116. The automation computing system 116 can include one or more computing devices configured to evaluate the environmental state of the autonomous vehicle 100, control one or more autonomous operations (e.g., autonomous driving operations) of the autonomous vehicle 100 in coordination with other components of the autonomous vehicle 100, and perform other tasks as will be explained in greater detail below. In such an example, the one or more computing devices may be configured to control one or more autonomous operations of the autonomous vehicle 100 through the use of one or more modules of computer program instructions that are executing on one or more of the computing devices. For example, the automation computing system 116 may be configured to process sensor data (e.g., data from the sensors 102-114 and potentially other sensors), operational data (e.g., a speed, acceleration, gear, orientation, turning direction), and other data to determine an operational state and/or operational history of the autonomous vehicle. The automation computing system 116 may then determine one or more operational commands for the autonomous vehicle (e.g., a change in speed or acceleration, a change in brake application, a change in gear, a change in turning or orientation, etc.) that may be effected via coordination between the automation computing system 116 and other components within the autonomous vehicle 100. For example, the automation computing system 116 may be coupled, directly or indirectly, for data communications with a device that can control the operation of a steering system within the autonomous vehicle 100. In such an example, if an analysis of sensor data causes the automation computing system 116 to determine that the direction of the autonomous vehicle 100 should be altered, the automation computing system 116 may issue one or more commands to the device that can control the operation of the steering system within the autonomous vehicle 100, thereby causing the device that can control the operation of a steering system within the autonomous vehicle 100 to change the direction of the autonomous vehicle by manipulating the steering system within the autonomous vehicle 100. The automation computing system 116 may also capture and store sensor data. Operational data of the autonomous vehicle may also be stored in association with corresponding sensor data, thereby indicating the operational data of the autonomous vehicle 100 at the time the sensor data was captured.

Although the autonomous vehicle 100 of FIG. 1 is shown as car, it is understood that autonomous vehicles 100 in accordance with embodiments of the present disclosure may also include other vehicles, including motorcycles, planes, helicopters, unmanned aerial vehicles (UAVs, e.g., drones), or other vehicles as can be appreciated. Moreover, it is understood that additional sensors or other external sensors may also be included in the autonomous vehicle 100.

Figure 2:
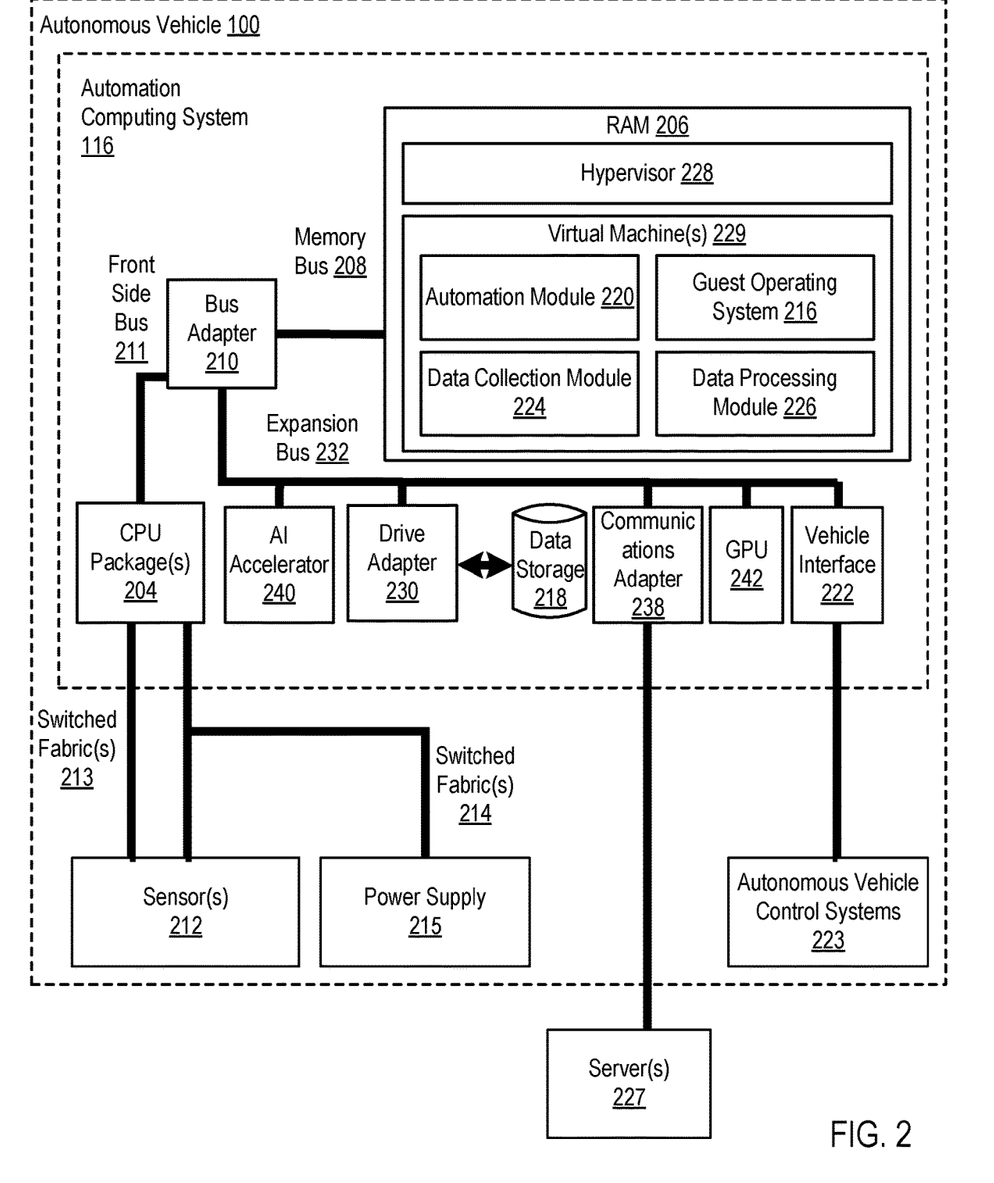
FIG. 2 is block diagram of an autonomous computing system for a redundant sensor fabric in an autonomous vehicle.

For further explanation, FIG. 2 sets forth a block diagram of automated computing machinery comprising an exemplary automation computing system 116 according to some embodiments of the present disclosure. The automation computing system 116 of FIG. 2 includes at least one computer Central Processing Unit (CPU') package 204 as well as random access memory 206 (RAM') which is connected through a data communications link (e.g., a bus) to the CPU packages 204 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service may then receive data from the secondary processing unit and a redundant processing unit may then be selected and have allocated the given process to ensure that two or more processing units are allocated the given process for redundancy and increased reliability.

The CPU packages 204 are communicatively coupled to one or more sensors 212. The sensors 212 may be configured to capture sensor data describing the operational and environmental conditions of an autonomous vehicle. For example, the sensors 212 may include sensors (e.g., the sensors 102-114 of FIG. 1), accelerometers, Global Positioning System (GPS) radios, Lidar sensors, or other sensors as can be appreciated. Although the sensors 212 are shown as being external to the automation computing system 116, it is understood that one or more of the sensors 212 may reside as a component of the automation computing system 212 (e.g., on the same board, within the same housing or chassis). The sensors 212 may be communicatively coupled with the CPU packages 204 via a switched fabric 213.

The switched fabric 213 comprises a communications topology through which the CPU packages 204 and sensors 212 are coupled via a plurality of switching mechanisms (e.g., latches, switches, crossbar switches, field programmable gate arrays (FPGAs), etc.). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established.

The CPU packages 204 and sensors 212 are configured to receive power from one or more power supplies 215. The power supplies 215 may comprise an extension of a power system of the autonomous vehicle 100 or an independent power source (e.g., a battery). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 214.

Stored in RAM 206 is an automation module 220. The automation module 220 may be configured to process sensor data from the sensors 212 to determine one or more operational commands for an autonomous vehicle 100 to affect the movement, direction, or other function of the autonomous vehicle 100, thereby facilitating autonomous driving or operation of the vehicle. Such operational commands may include a change in the speed of the autonomous vehicle 100, a change in steering direction, a change in gear, or other command as can be appreciated. For example, the automation module 220 may provide sensor data and/or processed sensor data as one or more inputs to a trained machine learning model (e.g., a trained neural network) to determine the one or more operational commands. The operational commands may then be communicated to autonomous vehicle control systems 223 via a vehicle interface 222. The autonomous vehicle control systems 223 are configured to affect the movement and operation of the autonomous vehicle 100. For example, the autonomous vehicle control systems 223 may turn or otherwise change the direction of the autonomous vehicle 100, accelerate or decelerate the autonomous vehicle 100, change a gear of the autonomous vehicle 100, or otherwise affect the movement and operation of the autonomous vehicle 100.

Further stored in RAM 206 is a data collection module 224 configured to process and/or store sensor data received from the one or more sensors 212. For example, the data collection module 224 may store the sensor data as captured by the one or more sensors 212, or processed sensor data 212 (e.g., sensor data 212 having object recognition, compression, depth filtering, or other processes applied). Such processing may be performed by the data collection module 224 in real-time or in substantially real-time as the sensor data is captured by the one or more sensors 212. The processed sensor data may then be used by other functions or modules. For example, the automation module 220 may use processed sensor data as input to determine one or more operational commands. The data collection module 224 may store the sensor data in data storage 218.

Also stored in RAM 206 is a data processing module 226. The data processing module 226 is configured to perform one or more processes on stored sensor data (e.g., stored in data storage 218 by the data collection module 218) prior to upload to a server 227. Such operations can include filtering, compression, encoding, decoding, or other operations as can be appreciated. The data processing module 226 may then communicate the processed and stored sensor data to the server 227. Readers will appreciate that although the embodiment depicted in FIG. 2 relates to an embodiment where the data processing module 226 communicates the processed and stored sensor data to the server 227, in other embodiments, the data processing module 226 may communicate with other types of environments such a cloud computing environment, data warehouse, or any other endpoint that may receive data from the autonomous vehicle 100.

Further stored in RAM 206 is a hypervisor 228. The hypervisor 228 is configured to manage the configuration and execution of one or more virtual machines 229. For example, each virtual machine 229 may emulate and/or simulate the operation of a computer. Accordingly, each virtual machine 229 may comprise a guest operating system 216 for the simulated computer. The hypervisor 228 may manage the creation of a virtual machine 229 including installation of the guest operating system 216. The hypervisor 228 may also manage when execution of a virtual machine 229 begins, is suspended, is resumed, or is terminated. The hypervisor 228 may also control access to computational resources (e.g., processing resources, memory resources, device resources) by each of the virtual machines.

Each of the virtual machines 229 may be configured to execute one or more of the automation module 220, the data collection module 224, the data processing module 226, or combinations thereof. Moreover, as is set forth above, each of the virtual machines 229 may comprise its own guest operating system 216. Guest operating systems 216 useful in autonomous vehicles in accordance with some embodiments of the present disclosure include UNIX™, Linux™, Microsoft Windows™, AIX™, IBM's i OS™, and others as will occur to those of skill in the art. For example, the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode. In such an example, the first operating system may be formally verified, secure, and operate in real-time such that data collected from the sensors 212 are processed within a predetermined period of time, and autonomous driving operations are performed within a predetermined period of time, such that data is processed and acted upon essentially in real-time. Continuing with this example, the second operating system may not be formally verified, may be less secure, and may not operate in real-time as the tasks that are carried out (which are described in greater detail below) by the second operating system are not as time-sensitive the tasks (e.g., carrying out self-driving operations) performed by the first operating system.

Readers will appreciate that although the example included in the preceding paragraph relates to an embodiment where the autonomous vehicle 100 may be configured to execute a first operating system when the autonomous vehicle is in an autonomous (or even partially autonomous) driving mode and the autonomous vehicle 100 may be configured to execute a second operating system when the autonomous vehicle is not in an autonomous (or even partially autonomous) driving mode, other embodiments are within the scope of the present disclosure. For example, in another embodiment one CPU (or other appropriate entity such as a chip, CPU core, and so on) may be executing the first operating system and a second CPU (or other appropriate entity) may be executing the second operating system, where switching between these two modalities is accomplished through fabric switching, as described in greater detail below. Likewise, in some embodiments, processing resources such as a CPU may be partitioned where a first partition supports the execution of the first operating system and a second partition supports the execution of the second operating system.

The guest operating systems 216 may correspond to a particular operating system modality. An operating system modality is a set of parameters or constraints which a given operating system satisfies, and are not satisfied by operating systems of another modality. For example, a given operating system may be considered a "real-time operating system" in that one or more processes executed by the operating system must be performed according to one or more time constraints. For example, as the automation module 220 must make determinations as to operational commands to facilitate autonomous operation of a vehicle. Accordingly, the automation module 220 must make such determinations within one or more time constraints in order for autonomous operation to be performed in real time. The automation module 220 may then be executed in an operating system (e.g., a guest operating system 216 of a virtual machine 229) corresponding to a "real-time operating system" modality. Conversely, the data processing module 226 may be able to perform its processing of sensor data independent of any time constraints, and may then be executed in an operating system (e.g., a guest operating system 216 of a virtual machine 229) corresponding to a "non-real-time operating system" modality.

As another example, an operating system (e.g., a guest operating system 216 of a virtual machine 229) may comprise a formally verified operating system. A formally verified operating system is an operating system for which the correctness of each function and operation has been verified with respect to a formal specification according to formal proofs. A formally verified operating system and an unverified operating system (e.g., one that has not been formally verified according to these proofs) can be said to operate in different modalities.

The automation module 220, data collection module 224, data collection module 224, data processing module 226, hypervisor 228, and virtual machine 229 in the example of FIG. 2 are shown in RAM 206, but many components of such software typically are stored in non-volatile memory also, such as, for example, on data storage 218, such as flash storage. Moreover, any of the automation module 220, data collection module 224, and data processing module 226 may be executed in a virtual machine 229 and facilitated by a guest operating system 216 of that virtual machine 229.

The exemplary automation computing system 116 of FIG. 2 includes a communications adapter 238 for data communications with other computers and for data communications with a data communications network. Such data communications may be carried out through data communications networks such as IP data communications networks, and in other ways as will occur to those of skill in the art. Communications adapters implement the hardware level of data communications through which one computer sends data communications to another computer, directly or through a data communications network. Examples of communications adapters useful in autonomous vehicle according to some embodiments of the present disclosure include 802.11 adapters for wireless data communications, mobile adapters (e.g., 4G communications adapters, LTE communications adapters, 5G communications adapters) for mobile data communications, and others. For example, the automation computing system 116 may communicate with one or more remotely disposed servers 227, or other communications endpoint as described above, via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, performance of any of the automation module 220, data collection module 224, data processing module 226, or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, performance of any of the automation module 220, data collection module 224, data processing module 226, or other operations of the automation computing system 116 may be performed at least in part by the GPUs 242.

Figure 3:
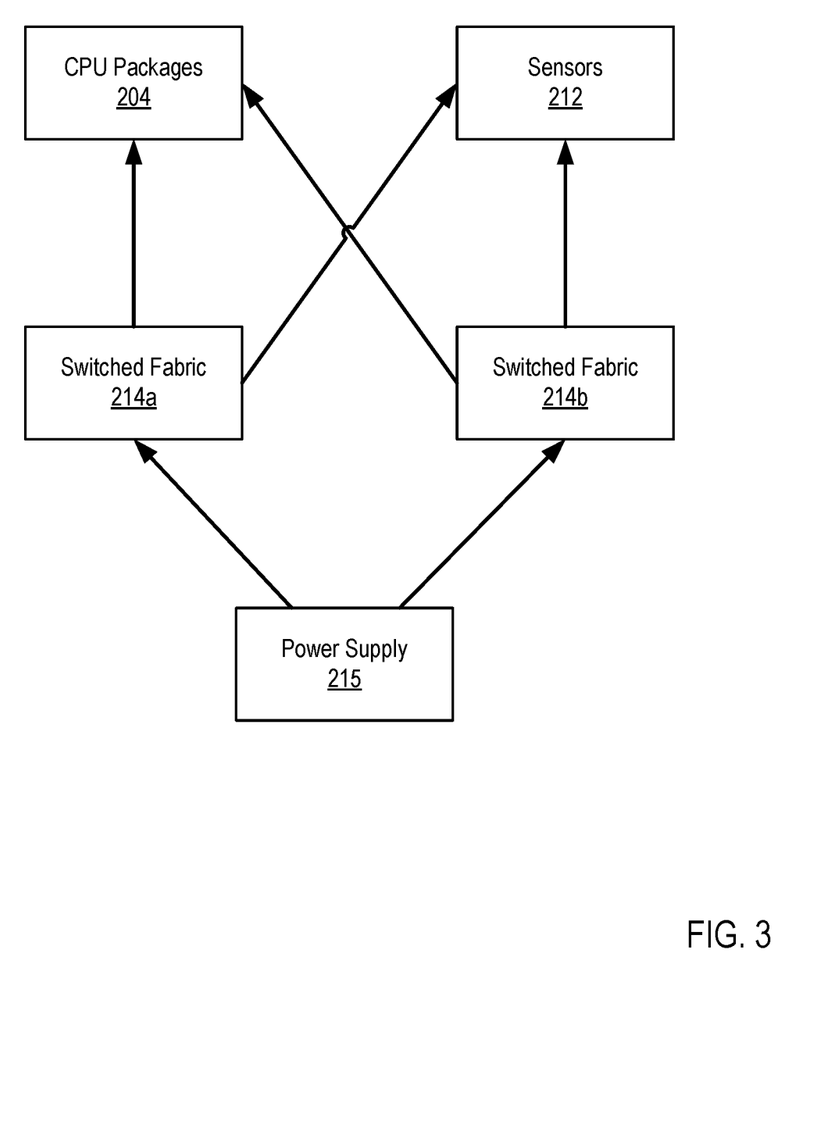
FIG. 3 is a block diagram of a redundant power fabric for an autonomous vehicle having a redundant sensor fabric.

FIG. 3 shows an example redundant power fabric for an autonomous vehicle having a redundant processor fabric. The redundant power fabric provides redundant pathways for power transfer between the power supplies 215, the sensors 212, the CPU packages 204, and may also be used for power transfer to other components not explicitly depicted in FIG. 3. In this example, the power supplies 215 are coupled to the sensors 212 and CPU packages via two switched fabrics 214a and 214b, although additional redundant resources may be incorporated in accordance with other embodiments of the present disclosure. The topology shown in FIG. 3 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, it is understood that the approach shown by FIG. 3 can be modified to include additional switched fabrics 214.

Figure 4:
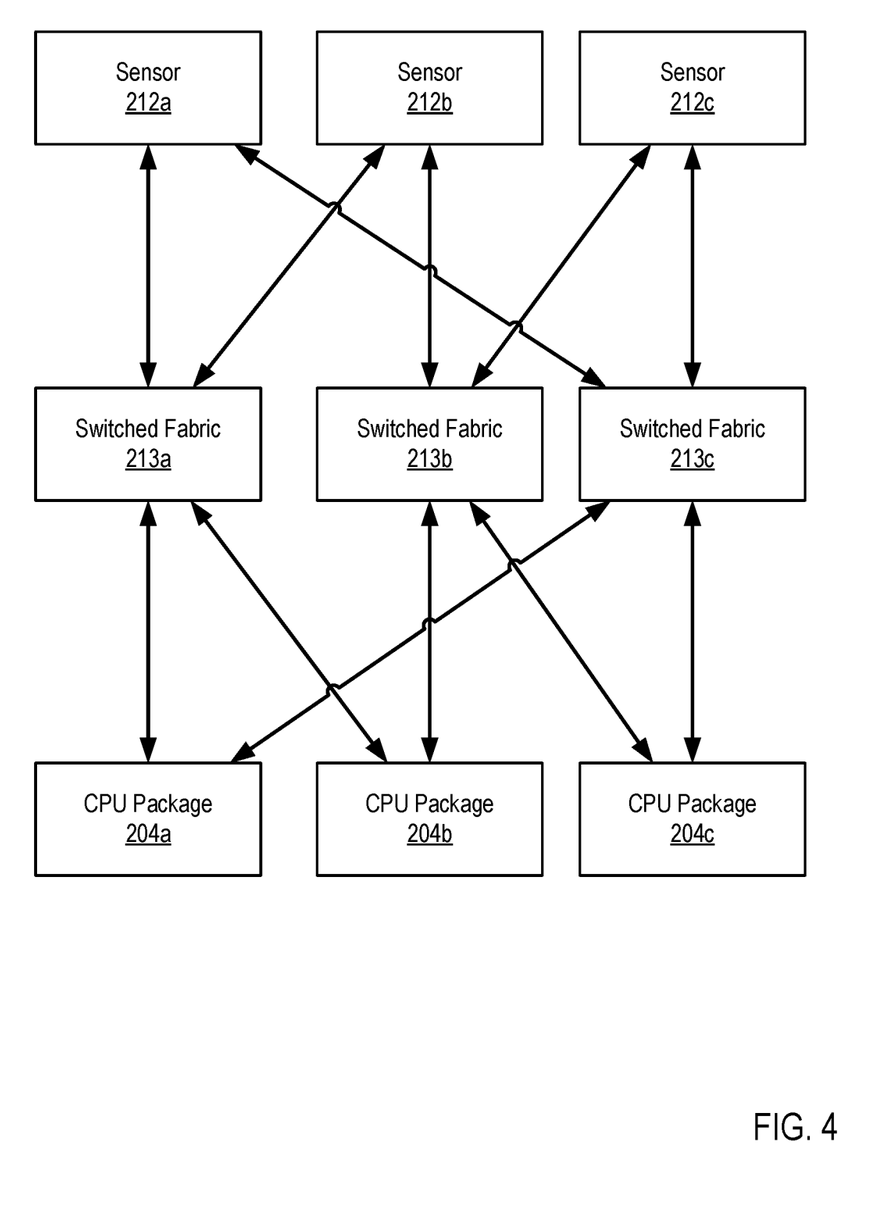
FIG. 4 is a block diagram of a redundant data fabric for an autonomous vehicle having a redundant sensor fabric.

FIG. 4 is an example redundant data fabric for an autonomous vehicle having a redundant processor fabric. The redundant data fabric provides redundant data connection pathways between sensors 212 and CPU packages 204, and may also provide redundant data connection pathways between other components not explicitly depicted in FIG. 4. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 4 is exemplary, and that CPU packages, switched fabrics, sensors, or connections between components may be added or removed while maintaining redundancy as can be appreciated by one skilled in the art.

Figure 5:
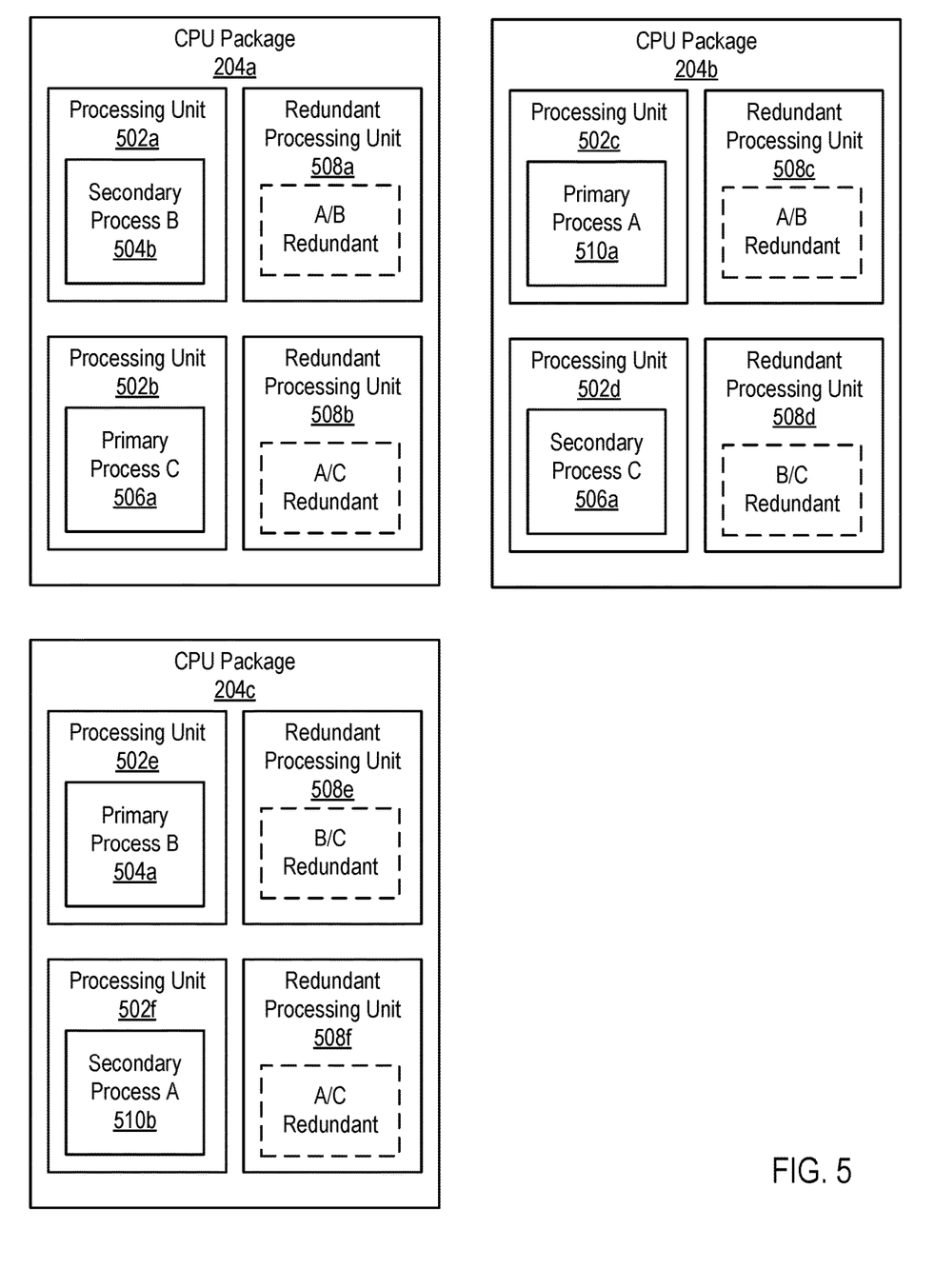
FIG. 5 is an example view of process allocation across CPU packages for a redundant sensor fabric in an autonomous vehicle.

FIG. 5 is an example view of process allocation across CPU packages for a redundant processing fabric in an autonomous vehicle. Shown are three CPU packages 204a, 204b, and 204c. Each CPU package 204a includes a processing unit that has been allocated (e.g., by a hypervisor 228 or other process or service) primary execution of a process and another processing unit that has been allocated secondary execution of a process. As set forth herein, primary execution of a process describes an executing instance of a process whose output will be provided to another process or service. Secondary execution of the process describes executing an instance of the process in parallel to the primary execution, but the output may not be output to the other process or service. For example, in CPU package 204a, processing unit 502a has been allocated secondary execution of "process B," denoted as secondary process B 504*b*, while processing unit 502*b* has been allocated primary execution of "process C," denoted as primary process C 506*a*.

CPU package 204*a* also comprises two redundant processing units that are not actively executing a process A, B, or C, but are instead reserved in case of failure of an active processing unit. Redundant processing unit 508*a* has been reserved as "AB redundant," indicating that reserved processing unit 508*a* may be allocated primary or secondary execution of processes A or B in the event of a failure of a processing unit allocated the primary or secondary execution of these processes. Redundant processing unit 508*b* has been reserved as "A/C redundant," indicating that reserved processing unit 508*b* may be allocated primary or secondary execution of processes A or C in the event of a failure of a processing unit allocated the primary or secondary execution of these processes.

CPU package 204*b* includes processing unit 502*c*, which has been allocated primary execution of "process A," denoted as primary process A 510*a*, and processing unit 502*d*, which has been allocated secondary execution of "process C," denoted as secondary process C 506*a*. CPU package 204*b* also includes redundant processing unit 508*c*, reserved as "AB redundant," and redundant processing unit 508*d*, reserved as "B/C redundant." CPU package 204*c* includes processing unit 502*e*, which has been allocated primary execution of "process B," denoted as primary process B 504*a*, and processing unit 502*f*, which has been allocated secondary execution of "process A," denoted as secondary process A 510*a*. CPU package 204*c* also includes redundant processing unit 508*e*, reserved as "B/C redundant," and redundant processing unit 508*f*, reserved as "A/C redundant."

As set forth in the example view of FIG. 5, primary and secondary instances of processes A, B, and C are each executed in an allocated processing unit. Thus, if a processing unit performing primary execution of a given process fails, the processing unit performing secondary execution may instead provide output of the given process to a receiving process or service. Moreover, the primary and secondary execution of a given process are executed on different CPU packages. Thus, if an entire processing unit fails, execution of each of the processes can continue using one or more processing units handling secondary execution. The redundant processing units 508*a*-*f* allow for allocation of primary or secondary execution of a process in the event of processing unit failure. This further prevents errors caused by processing unit failure as parallel primary and secondary execution of a process may be restored. One skilled in the art would understand that the number of CPU packages, processing units, redundant processing units, and processes may be modified according to performance requirements while maintaining redundancy.

Figure 6:
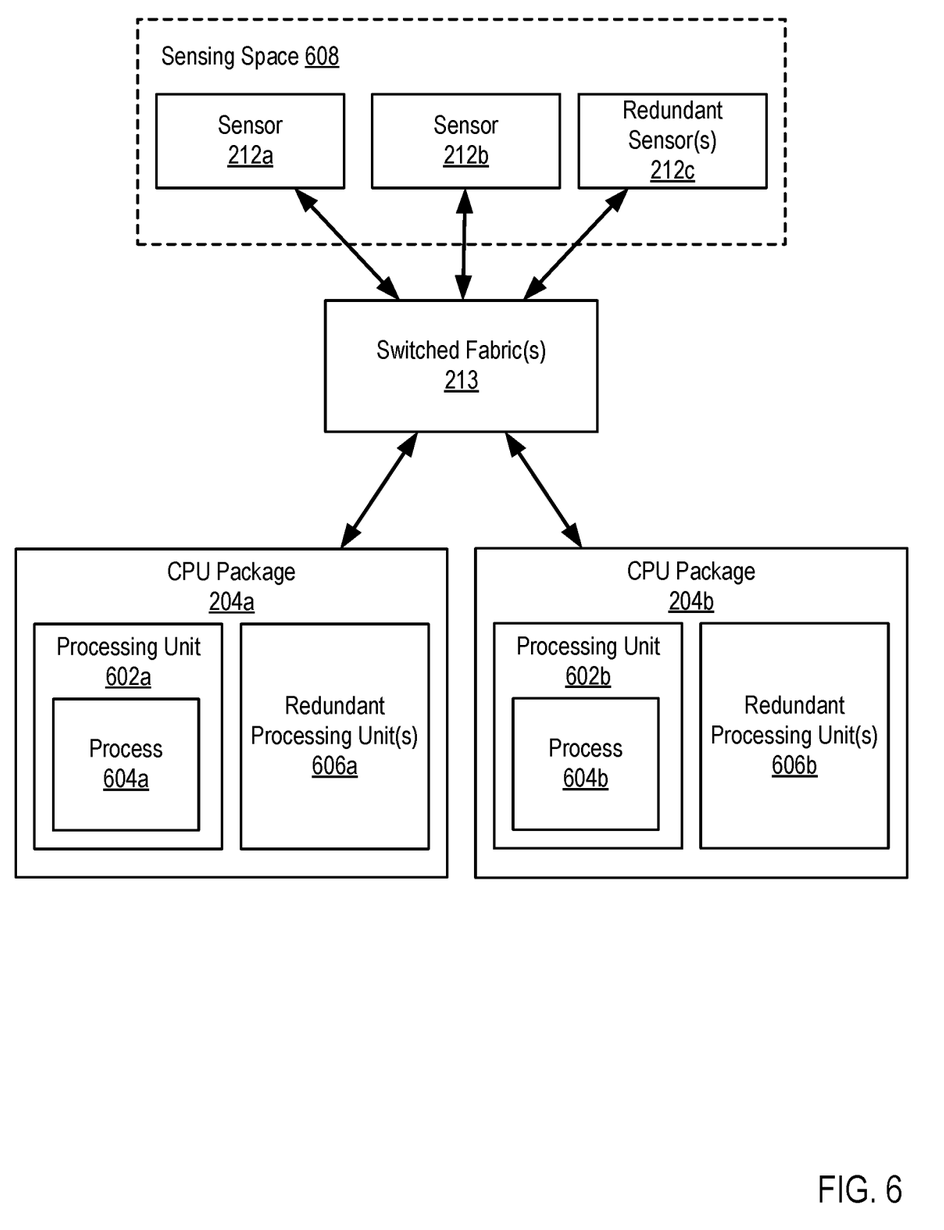
FIG. 6 is an example view of a redundant sensor fabric in an autonomous vehicle.

FIG. 6 is an example view of a redundant communications pathway for a redundant sensor fabric in an autonomous vehicle. Shown in this example are CPU packages 204*a* and 204*b*, which include processing units 602*a* and 602*b*, respectively. Processing unit 602*a* has been allocated execution of process 604*a* (e.g., by a hypervisor 228, or another process or service), and processing unit 602*a* has been allocated execution of process 604*b*. It is understood that the inclusion of processing units 602*a* and 602*b* is merely exemplary, and that CPU packages 204*a* and 204*b* may also include additional processing units, each of which may be allocated execution of additional processes. CPU packages 204*a* and 204*b* also each include redundant processing units 606*a* and 606*b*, respectively, which are processing units not yet allocated execution of a particular process.

CPU packages 204*a* and 204*b* are coupled to a switched fabric 213. The switched fabric 213 is also coupled to sensors 212*a*, 212*b*, and one or more redundant sensors 212*c*. A redundant sensor 212*c* is a sensor 212 whose output is not actively being processed (e.g., stored, encoded, or otherwise processed) by a process executed on a CPU package. For example, a redundant sensor 212*c* may be uninitialized, initialized but inactive, or otherwise redundant. The sensors 212*a* and 212*b*, and redundant sensors 212*c* are each associated with a same sensing space 608. A sensing space 608 is a shared targeted area or attribute for capture by a sensor 212. For example, a sensing space 608 for sensors 212 may comprise a same targeted area, a same or similar focal line, a same or similar field of view, or other similar area (e.g., installed on the same side of an autonomous vehicle 100). As another example, a plurality of accelerometer sensors 212 would share the sensing space 608 of the acceleration of a particular body (e.g., an autonomous vehicle 100).

Processes 604*a* and 604*b* may comprise separately executed instances of a same process for processing sensor data associated with the same sensing space 608. For example, process 604*a* may be configured to process sensor data from sensor 212*a*, while process 604*b* may be configured to process sensor data from sensor 212*b*. Accordingly, the switched fabric 213 may comprise a first communications pathway between the sensor 212*a* and the processing unit 602*a* and a second communications pathway between the CPU sensor 212*b* and the processing unit 602*b*.

In this example, output from processing unit 602*a* (e.g., from process 604*a*) may be sent to a receiving process (e.g., a process of an automation module 220, a process of a data collection module 224, or another process or service). Output from processing unit 602*b* (e.g., from process 604*b*) may be sent to the receiving process, but not actively acted upon by the receiving process. For example, the receiving process may ignore or drop output from processing unit 602*b*. Thus, processing units 602*a* and 602*b* process sensor data in parallel, but the receiving process only acts upon (e.g., processes) the output from the process 604*a*. In other words, process 604*a* may comprise a primary execution of a given process, while process 604*b* comprises a secondary execution of the given process.

In this example, a fault associated with the sensor 212*a* may be detected. Detecting a fault associated with the sensor may comprise determining (e.g., by the processing unit 602*a*, by the primary process 604*a*, or by another process or service) that the sensor data from the sensor 212*a* is non-qualifiable. Sensor data may be determined to be non-qualifiable when one or more functions to be applied to the sensor data are unable to be completed. For example, an object recognition, depth filtering, text recognition, or other function may be applied (e.g., by the processing unit 602*a*, by the primary process 604*b*) to the sensor data. Such a function may be considered incomplete, and therefore the sensor data non-qualifiable, when no data may be generated from the sensor data (e.g., no identified objects, no identified text). The sensor data may also be considered non-qualifiable when an exception or fault occurs when attempting to apply the given function. The sensor data may further be considered non-qualifiable when one or more data integrity functions (e.g., hash functions, cyclical redundancy checks) fail when applied to the sensor data.

Detecting the fault associated with the sensor 212*a* may also comprise comparing sensor data from the sensor 212*a* with sensor data from at least one other sensor (e.g., the sensor 212b and/or one or more redundant sensors 212c). Where sensor data from the sensor 212a is compared to sensor data from a redundant sensor 212c, the redundant sensor 212c may be awoken from an inactive state, or initialized and accessed for a period of time to determine that the fault associated with the sensor 212a. For example, on startup of an autonomous vehicle 100, while the autonomous vehicle 100 is stationary, or in response to a user command, a function may be initialized to compare sensor data from sensors in a same sensing space to determine if a fault is present in one of the sensors.

Detecting the fault associated with the sensor 212a may comprise determining that the sensor 212a is obstructed by identifying an object or other visual artifact in sensor data (e.g., image data or video data) from the sensor 212a that is not present in sensor data from the other sensors. For example, detecting the fault associated with the sensor 212a may comprise identifying a color differential between sensor data (e.g., image data or video data) from the sensor 212a and sensor data from the other sensors. For example, sensor data from the sensor 212a may experience a yellow tinting or other color variation due to degradation of a lens or other camera component. As another example, sensor data from the sensor 212a may experience a color variation in sensor data due to a semi-transparent or opaque substance or material present on the sensor 212.

Detecting the fault associated with the sensor 212a may also include determining a loss of a signal from the sensor 212a. For example, the processing unit 602a may determine the fault associated with the sensor when sensor data from the sensor 212a is no longer received. As another example, a dedicated circuit of the switching fabrics 213 may monitor channels of active communications pathways and determine that no signal, or a weak signal, is being communicated via the communications pathway from the sensor 212a. Detecting the fault associated with the sensor 212a may also include determining that the sensor 212a fails to respond to a query, request, or message.

In response to detecting the fault associated with the sensor 212a, a communications path can be established, via the switched fabric 213, between the processing unit 602a and another sensor. Establishing the communications path between the processing unit 602a and the other sensor may comprise sending one or more signals (e.g., by the processing unit 602a, by a circuit or process monitoring communications paths of the switched fabric 213, by a hypervisor 228 or by another entity) to one or more switching components of the switched fabric 213 to establish the communications path. Establishing the communications path between the processing unit 602a and the other sensor may comprise sending one or more signals (e.g., by the processing unit 602a, by a circuit or process monitoring communications paths of the switched fabric 213, by a hypervisor 228 or by another entity) to one or more switching components of the switched fabric 213 to break, remove, or otherwise circumvent the communications path between the failed sensor 212a and the processing unit 602a.

The other sensor with which the communications path to the processing unit 602a is established may comprise a redundant sensor 212c, thereby "activating" the redundant sensor 212c. Accordingly, establishing the communications path may also comprise waking or activating the redundant sensor 212. In this example, the switched fabric 213 provides, before the fault is detected, a first communications path between the sensor 212a and the processing unit 602a, and a second communications path between the sensor 212b and the processing unit 604b. After the fault is detected and the communications path established, the switched fabric 213 provides the second communications path and a third communications path between a redundant sensor 212c and the processing unit 602a.

The other sensor with which the communications path to the processing unit 602a is established may comprise the sensor 212b (e.g., a sensor 212 already providing sensor data to another processing unit). For example, there may be no redundant sensors 212c available, or the redundant sensors 212c may themselves be faulty. Accordingly, establishing the communications path may also comprise duplicating, via the switched fabric 213, the sensor data from the second sensor 212b for communication to the processing unit 602a. Thus, processing units 602a and 602b (facilitated by processes 604a and 604b) may then process sensor data from the sensor 212b. This ensures that parallel processing of sensor data associated with the sensing space 608 is maintained, providing redundancy in the event of processing unit failure.

Communications paths may be established with additional redundant sensors 212c in the event that faults with other active sensors (e.g., the sensor 212b or activated redundant sensors 212c) so long as at least one redundant sensor 212c is available for activation. Once no redundant sensors 212c are available, sensor data from an active sensor may then be duplicated and communicated to the appropriate processing unit.

Figure 7:
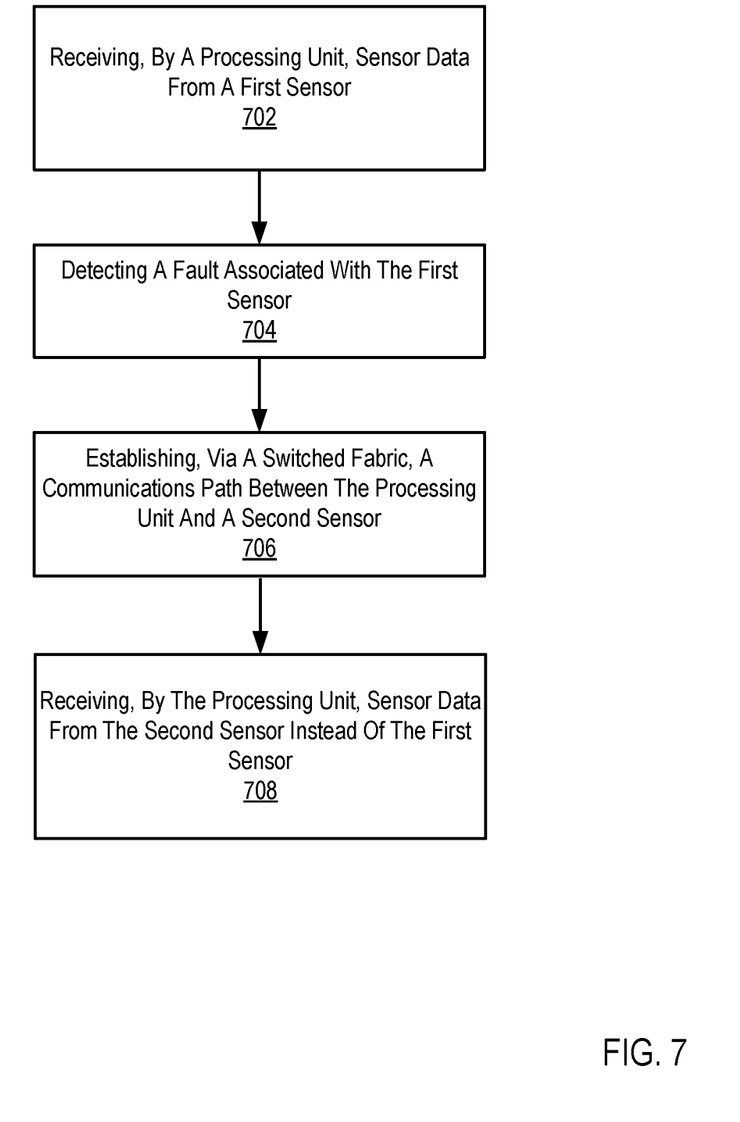
FIG. 7 is a flowchart of an example method for a redundant sensor fabric in an autonomous vehicle.

For further explanation, FIG. 7 sets forth a flow chart illustrating an exemplary method for a redundant sensor fabric in an autonomous vehicle that includes receiving 702, by a processing unit (e.g., a processing unit 602a), sensor data from a first sensor 212 (e.g., a sensor 212a). The processing unit may comprise one of a plurality of processing units. For example, the processing unit may be included in a plurality of processing units of a CPU package 204.

Moreover, the CPU package 204 may be one of a plurality of CPU packages 204. The first sensor 212 may comprise one of a plurality of sensors 212. The plurality of sensors 212 may comprise one or more redundant sensors 212c.

The plurality of sensors 212 may be associated with a same sensing space 608. For example, the plurality of sensors 212 may be installed on a same side of an autonomous vehicle 100 (e.g., front side, left side, right side, back side) and configured to capture sensor data (e.g., images or video) from the perspective of the given side. As another example, the plurality of sensors 212 may be configured to detect a same attribute associate with the operation of the autonomous vehicle 100 (e.g., speed, acceleration, GPS location). The plurality of sensors 212 and the plurality of processing units may be coupled via one or more switched fabrics 213

The method of FIG. 7 further comprises detecting 704 a fault associated with the first sensor 212. Detecting a fault associated with the first sensor 212 may comprise determining (e.g., by the processing unit, by a processes allocated for execution by the processing unit, or by another process or service) that the sensor data from the first sensor 212 is non-qualifiable. Sensor data may be determined to be non-qualifiable when one or more functions to be applied to the sensor data are unable to be completed. For example, an object recognition, depth filtering, text recognition, or other function may be applied (e.g., by the processing unit) to the sensor data. Such a function may be considered incomplete, and therefore the sensor data non-qualifiable, when no data may be generated from the sensor data (e.g., no identified objects, no identified text). The sensor data may also be considered non-qualifiable when an exception or fault occurs when attempting to apply the given function. The sensor data may further be considered non-qualifiable when one or more data integrity functions (e.g., hash functions, cyclical redundancy checks) fail when applied to the sensor data.

Detecting the fault associated with the first sensor 212 may also include determining a loss of a signal from the first sensor. For example, the processing unit 602a may determine the fault associated with the first sensor 212 when sensor data from the first sensor 212 is no longer received. As another example, a dedicated circuit of the switching fabrics 213 may monitor channels of active communications pathways and determine that no signal, or a weak signal, is being communicated via the communications pathway from the first sensor 212. Detecting the fault associated with the first sensor 212 may also include determining that the first sensor 212 fails to respond to a query, request, or message.

The method of FIG. 7 further comprises establishing 706, via a switched fabric 213, a communications path between the processing unit and a second sensor 212. Establishing the communications path between the processing unit and the second sensor 212 may comprise sending one or more signals (e.g., by the processing unit, by a circuit or process monitoring communications paths of the switched fabric 213, by a hypervisor 228 or by another entity) to one or more switching components of the switched fabric 213 to establish the communications path. Establishing the communications path between the processing unit and the second sensor 212 may comprise sending one or more signals (e.g., by the processing unit, by a circuit or process monitoring communications paths of the switched fabric 213, by a hypervisor 228 or by another entity) to one or more switching components of the switched fabric 213 to break, remove, or otherwise circumvent the communications path between the failed first sensor 212 and the processing unit.

The other sensor with which the communications path to the processing unit is established may comprise a redundant sensor 212c, thereby "activating" the redundant sensor 212c. Accordingly, establishing the communications path may also comprise waking or activating the redundant sensor 212. The method of FIG. 7 further comprises receiving 708, by the processing unit, sensor data from the second sensor 212 instead of the first sensor 212.

Figure 8:
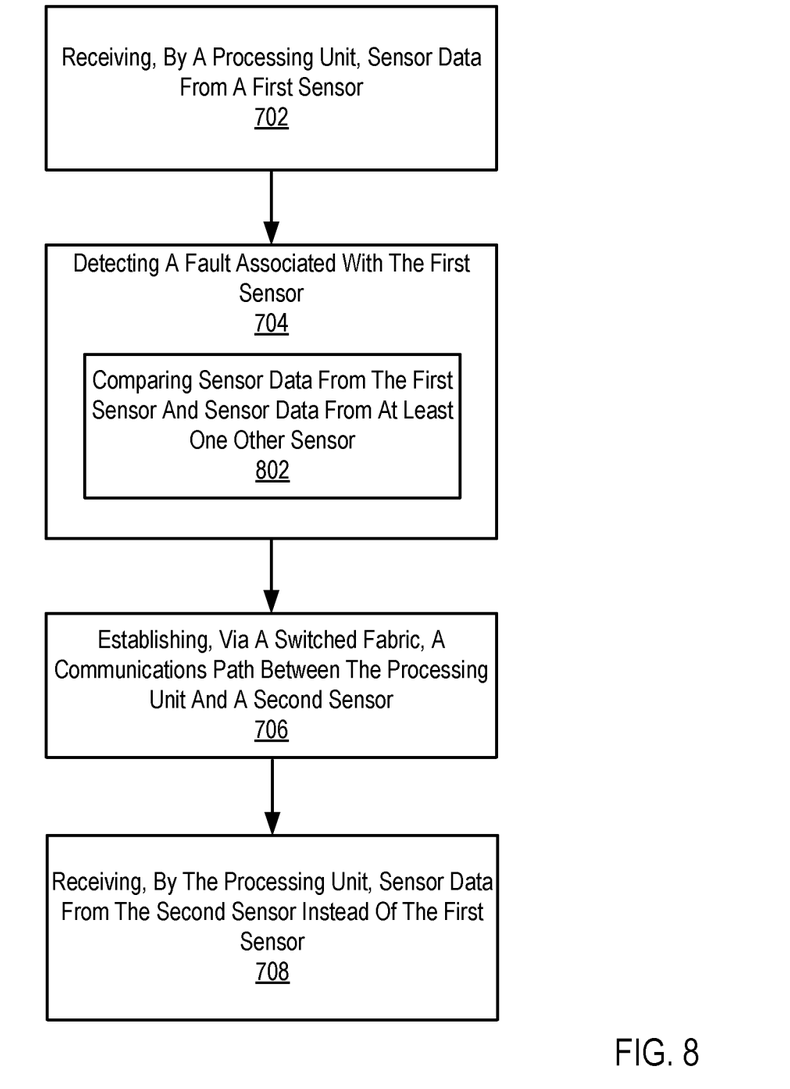
FIG. 8 is a flowchart of an example method for a redundant sensor fabric in an autonomous vehicle.

For further explanation, FIG. 8 sets forth a flow chart illustrating an exemplary method for a redundant sensor fabric in an autonomous vehicle that includes receiving 702, by a processing unit, sensor data from a first sensor 212; detecting 704 a fault associated with the first sensor 212; establishing 706, via a switched fabric 213, a communications path between the processing unit and a second sensor 212, and receiving 708, by the processing unit, sensor data from the second sensor 212 instead of the first sensor 212.

FIG. 8 differs from FIG. 7 in that detecting 704 the fault associated with the first sensor 212 comprises comparing 802 sensor data from the first sensor 212 and sensor data from at least one other sensor 212. For example, sensor data from the first sensor 212 may be compared to sensor data from an active second sensor 212 providing sensor data to another processing unit. Sensor data from the first sensor 212 may also be compared to sensor data from a redundant sensor 212c. Where sensor data from the first sensor 212 is compared to sensor data from a redundant sensor 212c, the redundant sensor 212c may be awoken from an inactive state, or initialized and accessed for a period of time to determine that the fault associated with the sensor 212a. For example, on startup of an autonomous vehicle 100, while the autonomous vehicle 100 is stationary, or in response to a user command, a function may be initialized to compare sensor data from sensors in a same sensing space to determine if a fault is present in one of the sensors.

Comparing sensor data from the first sensor 212 and sensor data from at least one other sensor 212 may comprise determining that the first sensor 212 is obstructed by identifying an object or other visual artifact in sensor data (e.g., image data or video data) from the first sensor 212 that is not present in sensor data from the other sensors. Comparing sensor data from the first sensor 212 and sensor data from at least one other sensor 212 may comprise identifying a color differential between sensor data (e.g., image data or video data) from the first sensor 212 and sensor data from the other sensors. For example, sensor data from the first sensor 212 may experience a yellow tinting or other color variation due to degradation of a lens or other camera component. As another example, sensor data from the first sensor 212 may experience a color variation in sensor data due to a semi-transparent or opaque substance or material present on the sensor 212.

Figure 9:
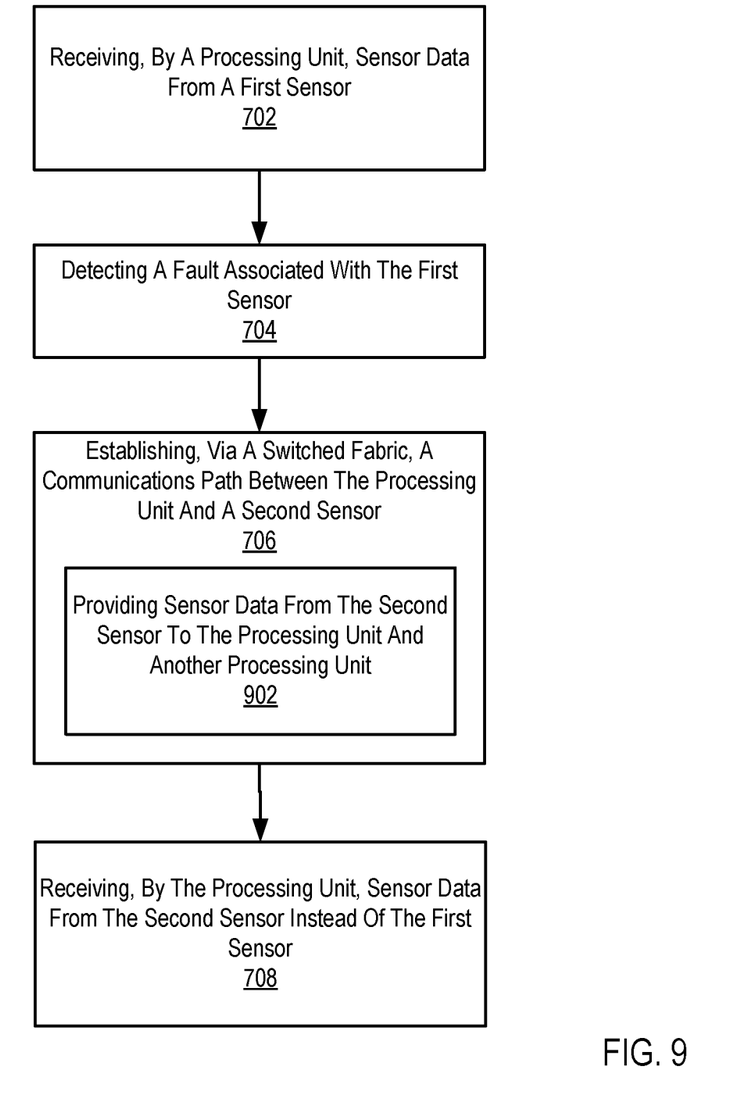
FIG. 9 is a flowchart of an example method for a redundant sensor fabric in an autonomous vehicle.

For further explanation, FIG. 9 sets forth a flow chart illustrating an exemplary method for a redundant sensor fabric in an autonomous vehicle that includes receiving 702, by a processing unit, sensor data from a first sensor 212; detecting 704 a fault associated with the first sensor 212; establishing 706, via a switched fabric 213, a communications path between the processing unit and a second sensor 212, and receiving 708, by the processing unit, sensor data from the second sensor 212 instead of the first sensor 212.

FIG. 9 differs from FIG. 8 in that establishing 706, via the switched fabric 213, a communications path between the processing unit and a second sensor 212 comprises providing 902 sensor data from the second sensor 212 to the processing unit and another processing unit. For example, the other processing unit may comprise a processing unit configured to process, prior to detecting the fault in the first sensor 212, sensor data from the second sensor 212 (e.g., in parallel to the processing unit processing the sensor data from the first sensor 212). For example, there may be no redundant sensors 212c available for coupling to the processing unit in place of the first sensor 212, or the redundant sensors 212c may themselves be faulty. Accordingly, establishing the communications path may also comprise duplicating, via the switched fabric 213, the sensor data from the second sensor 212b for communication to the processing unit and the other processing unit. This ensures that parallel processing of sensor data associated with the sensing space 608 is maintained, providing redundancy in the event of processing unit failure.

In view of the explanations set forth above, readers will recognize that the benefits of a redundant sensor fabric in an autonomous vehicle according to embodiments of the present invention include:
  The ability to recover from sensor failure in an automated vehicle in substantially real-time, thereby maintaining performance of the automated vehicle.
  The ability to preserve parallel sensor data processing within a given sensing space, allowing for both redundancy and reliability in the event of sensor failure or processor failure.

Exemplary embodiments of the present invention are described largely in the context of a fully functional computer system for a redundant sensor fabric in an autonomous vehicle. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for a redundant sensor fabric in an autonomous vehicle, comprising:
   receiving, by a processing unit, sensor data from a first sensor of a plurality of sensors associated with a same sensing space of the autonomous vehicle;
   detecting a fault associated with the first sensor;
   establishing, via a switched fabric, in response to detecting the fault, a communications path between the processing unit and a second sensor of the plurality of sensors; and
   receiving, by the processing unit, sensor data from the second sensor instead of the first sensor.

2. The method of claim 1, wherein detecting the fault associated with the first sensor comprises determining that the sensor data from the first sensor is non-qualifiable.

3. The method of claim 1, wherein detecting the fault associated with the first sensor comprises comparing the sensor data from the first sensor and sensor data from at least one other sensor of the plurality of sensors.

4. The method of claim 3, wherein detecting the fault associated with the first sensor comprises determining that the first sensor is obstructed.

5. The method of claim 1, wherein the second sensor comprises a redundant sensor of the plurality of sensors.

6. The method of claim 1, wherein the second sensor is configured to provide, via the switched fabric, sensor data to another processing unit, and wherein establishing the communications path comprises providing the sensor data from the second sensor to the processing unit and the another processing unit.

7. An apparatus for a redundant sensor fabric in an autonomous vehicle, the apparatus configured to perform steps comprising:
   receiving, by a processing unit, sensor data from a first sensor of a plurality of sensors associated with a same sensing space of the autonomous vehicle;
   detecting a fault associated with the first sensor;
   establishing, via a switched fabric, a communications path between the processing unit and a second sensor of the plurality of sensors; and
   receiving, by the processing unit, sensor data from the second sensor instead of the first sensor.

8. The apparatus of claim 7, wherein detecting the fault associated with the first sensor comprises determining that the sensor data from the first sensor is non-qualifiable.

9. The apparatus of claim 7, wherein detecting the fault associated with the first sensor comprises comparing the sensor data from the first sensor and sensor data from at least one other sensor of the plurality of sensors.

10. The apparatus of claim 9, wherein detecting the fault associated with the first sensor comprises determining that the first sensor is obstructed.

11. The apparatus of claim 7, wherein the second sensor comprises a redundant sensor of the plurality of sensors.

12. The apparatus of claim 7, wherein the second sensor is configured to provide, via the switched fabric, sensor data to another processing unit, and wherein establishing the communications path comprises providing the sensor data from the second sensor to the processing unit and the another processing unit.

13. An autonomous vehicle implementing a redundant sensor fabric, the autonomous vehicle comprising an apparatus configured to perform steps comprising:
   receiving, by a processing unit, sensor data from a first sensor of a plurality of sensors associated with a same sensing space of the autonomous vehicle;
   detecting a fault associated with the first sensor;
   establishing, via a switched fabric, a communications path between the processing unit and a second sensor of the plurality of sensors; and
   receiving, by the processing unit, sensor data from the second sensor instead of the first sensor.

14. The autonomous vehicle of claim 13, wherein detecting the fault associated with the first sensor comprises determining that the sensor data from the first sensor is non-qualifiable.

15. The autonomous vehicle of claim 13, wherein detecting the fault associated with the first sensor comprises comparing the sensor data from the first sensor and sensor data from at least one other sensor of the plurality of sensors.

16. The autonomous vehicle of claim 15, wherein detecting the fault associated with the first sensor comprises determining that the first sensor is obstructed.

17. The autonomous vehicle of claim 13, wherein the second sensor comprises a redundant sensor of the plurality of sensors.

18. The autonomous vehicle of claim 13, wherein the second sensor is configured to provide, via the switched fabric, sensor data to another processing unit, and wherein establishing the communications path comprises providing the sensor data from the second sensor to the processing unit and the another processing unit.

19. A computer program product disposed upon a non-transitory computer readable medium, the computer program product comprising computer program instructions for a redundant sensor fabric in an autonomous vehicle that, when executed, cause a computer system to carry out the steps of:

receiving, by a processing unit, sensor data from a first sensor of a plurality of sensors associated with a same sensing space of the autonomous vehicle;

detecting a fault associated with the first sensor;

establishing, via a switched fabric, a communications path between the processing unit and a second sensor of the plurality of sensors; and receiving, by the processing unit, sensor data from the second sensor instead of the first sensor.

20. The computer program product of claim 19, wherein detecting the fault associated with the first sensor comprises determining that the sensor data from the first sensor is non-qualifiable.

\* \* \* \* \*